Aug. 19, 1930.　　J. R. GAMMETER　　1,773,138
TUBE MOLDING APPARATUS
Filed July 20, 1926
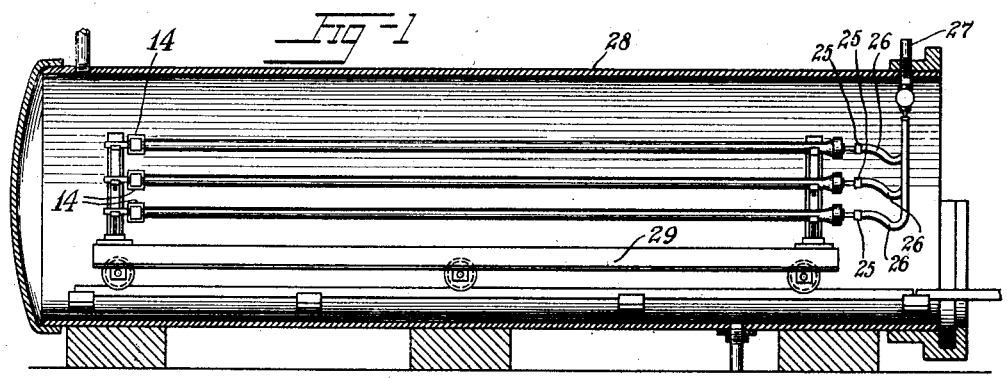
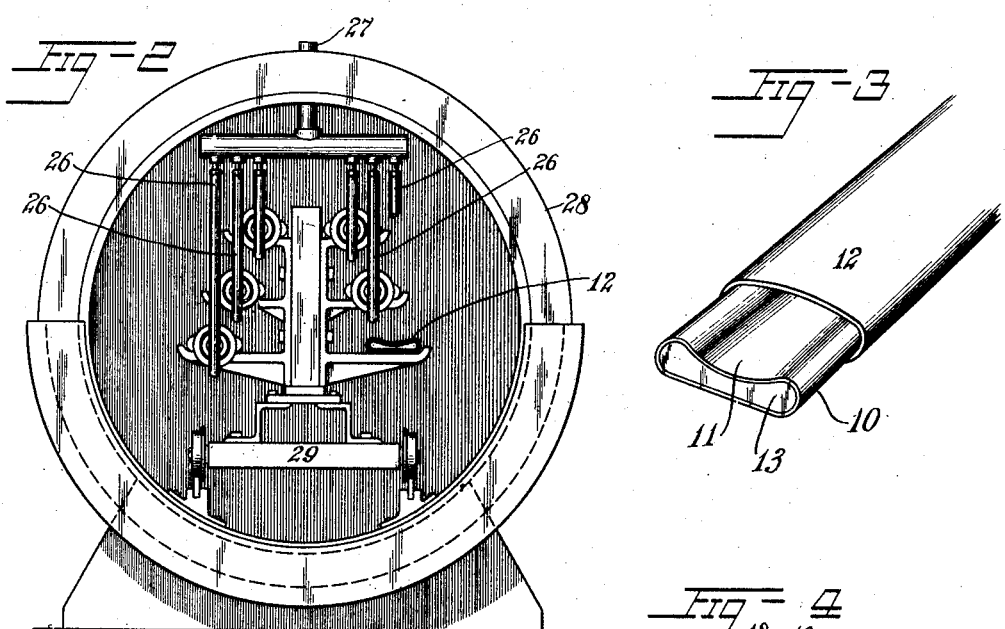
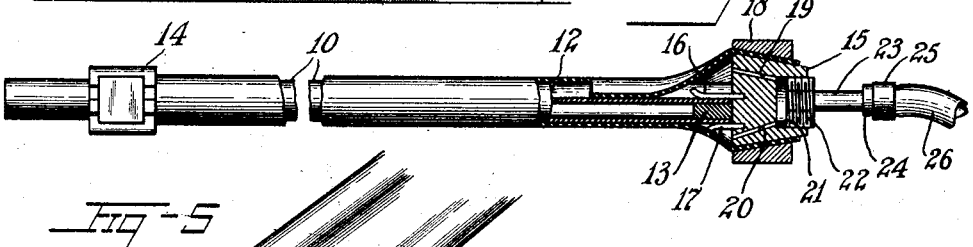
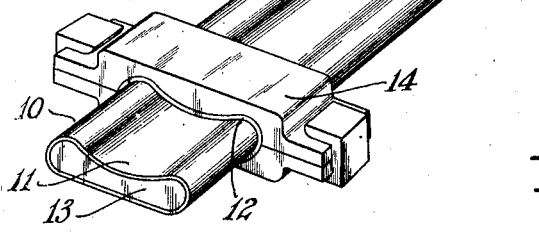
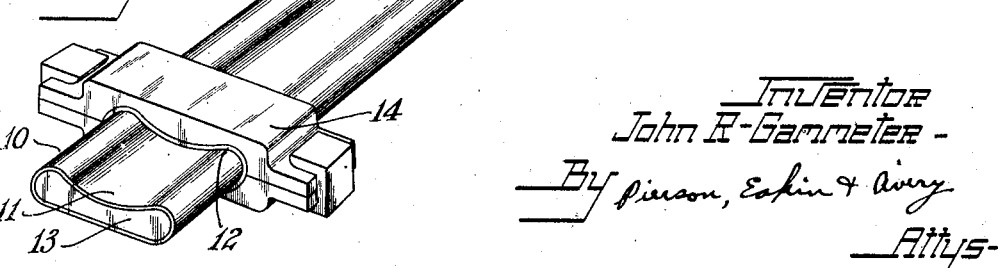
Inventor
John R. Gammeter -
By Pierson, Eakin & Avery
Attys- Patented Aug. 19, 1930

1,773,138

UNITED STATES PATENT OFFICE

JOHN R. GAMMETER, OF AKRON, OHIO, ASSIGNOR TO THE B. F. GOODRICH COMPANY, OF NEW YORK, N. Y., A CORPORATION OF NEW YORK

TUBE-MOLDING APPARATUS

Application filed July 20, 1926. Serial No. 123,659.

This invention relates to the art of making tubular articles such as hose or hose linings and its general object is to provide improved procedure and apparatus for vulcanizing such articles in a flattened condition. More specific objects are to provide for easy mounting and removal of the work with relation to the mandrel upon which it is vulcanized and to provide a hose accurately molded in a desirable flattened form such as to facilitate the reeling of it.

Of the accompanying drawings:

Fig. 1 is a vertical, longitudinal section of a horizontal vulcanizer having mounted therein a set of hose mandrels and associated equipment embodying and adapted to carry out my invention in its preferred form.

Fig. 2 is an end elevation of the same, the door of the vulcanizer being removed.

Fig. 3 is a perspective view of a portion of one of the mandrels and the work thereon.

Fig. 4 is a side view of one of the mandrels, the work thereon and associated apparatus, parts being sectioned and broken away.

Fig. 5 is a perspective view of a portion of one of the mandrels and the work thereon, and a sealing clamp holding the work against the mandrel.

Referring to the drawings, I provide a mandrel 10 of elongated form in cross-section and having at least one side face 11 inwardly curved or concave so that although the transverse perimeter of the mandrel may be equal to or greater than the length of the cross-sectional inner periphery of the tube, such as the hose or hose lining 12, to be vulcanzied thereon, the tube, bridging the concave face 11, is readily slipped onto the mandrel, as shown in Fig. 3. The tube is preferably made initially of circular cross-sectional form, for convenience of manufacture.

The mandrel is preferably hollow, for lightness, and in such case it is preferably provided with means to prevent passage of fluid through it, such as an end plug or plugs 13, 13.

When the tube 12 is slipped to the proper position upon the mandrel one end portion of the tube is clamped against the mandrel to seal it thereto, as by means of the clamp shown at 14, and the other end of the mandrel and the other end of the tube thereon are associated with means for venting the space between the tube and the mandrel as shown clearly in Fig. 4, where the venting means comprises an outwardly tapered venting block 15 provided with a pair of spring clips 16, 17 adapted to straddle the end of the mandrel to hold the block thereon. The block is adapted to receive over its tapered outer face the end portion of the tube, the latter projecting beyond the mandrel. A collar 18 internally tapered as the complement of the tapered face of the block is adapted to be passed onto the end of the tube to clamp and seal it against the block, as shown clearly in Fig. 4, and the block is traversed by apertures 19, 20 leading from the inner face of the block, within the tube, to a socket 21 formed in the outer face of the block, in which socket is mounted an apertured plug 22 provided with a stem 23 terminating in a quick-detachable coupling member 24 which is adapted to mate with a coupling member 25 on the end of one of a set of flexible vent pipes 26, 26 which branch from a manifold vent pipe 27 mounted in the wall of a vulcanizer 28 and communicating with the outer atmosphere.

A number of the tubes or hoses being mounted upon respective mandrels and assembled with the respective venting blocks 15 as described, the mandrels with the work and the blocks thereon are mounted upon a heater car 29 and run into the vulcanizer, the flexible pipes 26 are coupled to the respective venting blocks, the door of the vulcanizer is closed, and the tubes or hoses are vulcanized by charging the vulcanizer with steam.

The pressure of the steam causes each hose or tube to be bowed inwardly into contact with the concave face of its mandrel in which position it fits snugly about the mandrel, the air being vented from between the hose and the mandrel, to the outer atmosphere, through the block 15 and the manifold pipe 27. After the vulcanizing operation the tubes are readily stripped from the mandrels by reason of the cross-sectional form of the latter.

Thus the several advantages of procedure expressed in the above statement of objects are obtained, and a hose or tube is produced having a natural flattened form such as to facilitate the reeling of it, the form being such that one convolution of the reeled hose will nest in the underlying one and provide a comparatively stable wound structure independently of reel-ends and a winding which may be very compact without very much flexure of the hose from its natural form.

The hose may be given a transverse stretch, if desired, by initially forming it of less cross-sectional perimeter than that of the mandrel and then forcing it into the concavity of the latter, and yet the hose may be easily mounted and removed.

My invention is not wholly limited to employing fluid pressure to depress the hose into contact with the concave face of the mandrel, and may be variously modified in other respects without departure from its scope.

I claim:

1. Tube-molding apparatus comprising an elongated, substantially straight mandrel of approximately uniform cross-sectional form substantially throughout its length, means for sealing to the mandrel one end of a tube mounted thereon, means for applying fluid pressure to the exterior of the tube, and means for venting the space between the mandrel and the tube at the other end portion only of the tube.

2. Tube molding apparatus comprising an elongated, substantially straight mandrel formed with a transversely concave outer face extending longitudinally and substantially throughout its length, a fluid-pressure chamber adapted to receive the said mandrel with a tube thereon, a block mounted upon the end of the mandrel and traversed by a vent aperture for venting the space between the mandrel and the tube to the exterior of the said chamber, and means for sealing the adjacent end of the tube to the said block.

In witness whereof I have hereunto set my hand this 17th day of July, 1926.

JOHN R. GAMMETER.